UNITED STATES PATENT OFFICE.

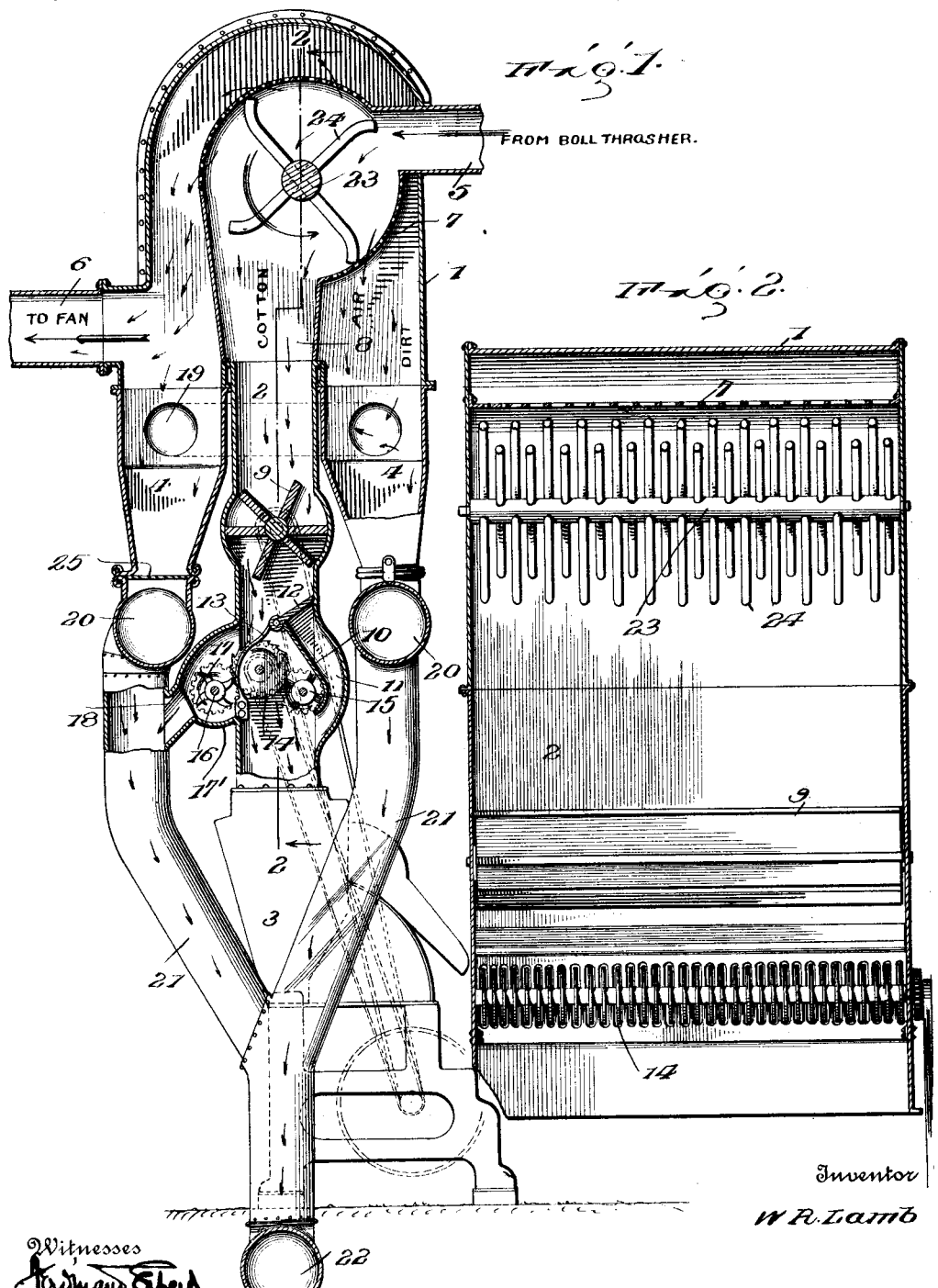

WILLIAM R. LAMB, OF DALLAS, TEXAS.

BUR-EXTRACTOR FOR COTTON-FEEDERS.

1,105,442.  Specification of Letters Patent.  Patented July 28, 1914.

Application filed June 22, 1912. Serial No. 705,343.

*To all whom it may concern:*

Be it known that I, WILLIAM R. LAMB, citizen of the United States, residing at Dallas, in the county of Dallas and State of Texas, have invented certain new and useful Improvements in Bur-Extractors for Cotton-Feeders, of which the following is a specification.

This invention is a mechanism to be used in connection with elevating and distributing systems for cotton gins, and the object of the present invention is to provide means whereby all burs or hulls will be effectually extracted from the cotton before the cotton passes to the gin feeders or gins.

The invention also has for its object the provision of improved means for separating, removing, and discharging the burs, trash and other foreign matter from the seed cotton so that the cotton which passes to the gin feeders or gins will be thoroughly cleaned, and the wear on the blades of the fan will be reduced to a minimum.

In the drawings: Figure 1 is a vertical sectional elevation of the preferred form of my invention; and Fig. 2 is a sectional view taken on the line 2—2 of Fig. 1.

The invention will be hereinafter first fully described in connection with the accompanying drawings, and the novel features will be subsequently pointed out more in detail in the claims following the description.

In carrying out my present invention, I employ a casing 1 having a central discharge tube 2 which leads to the gin indicated at 3, and at the sides of the said central discharge tube 2 are other dirt discharge tubes or spouts 4. A suction tube 5 leads into the casing 1 at the upper end of the same, and from the opposite side of the casing below the upper end thereof a suction tube 6 leads to a fan by which the suction through the apparatus is created so as to draw the cotton from a wagon or a storage house into the cleaning and feeding apparatus.

A hulling or threshing mechanism may be inserted in the inlet tube 5 so as to effect a partial separation of the cotton and dirt before it reaches the casing 1, and said mechanism may be of any preferred construction. The inlet tube 5 leads directly into an inner casing 7 which is spaced from the outer casing 1 and is constructed of perforated or reticulated material, preferably in the form of slotted metal, as will be readily understood. This inner casing 7 is preferably of cylindrical form, spaced from the outer casing, and constructed with a downwardly extending spout or nozzle 8 leading directly into the cotton discharge tube 2, as shown. At an intermediate point of the length of the discharge tube 2 is provided a rotary valve 9 which is constantly rotating when the apparatus is in operation so as to prevent the creation of back currents and consequently counteract any tendency of the cotton to choke the outlet tube.

A short distance below the valve 9 the tube 2 is provided with an internal partition 10 which is spaced from the side of the tube to form a by-pass 11 through which the cotton may be directed when it is sufficiently cleaned and free from hulls or burs to be fed into the gin without further treatment. At the upper end of the partition 10 is provided a valve 12 which may be manipulated to extend across the by-pass so that the cotton will be deflected therefrom, or to extend to the opposite side of the tube so that the cotton will be deflected into the by-pass, as may be preferred. Extending downwardly from the pivot of this valve and diverging from the partition 10 are a series of guard ribs 13 which extend between the saws 14 and are secured to the tube 2 below the saws as shown. Between the saws and the partition 10 a brush 15 is provided to sweep against the saw teeth and remove therefrom any particles of cotton which may tend to adhere thereto.

In advance of the ribs 13 and immediately adjacent the same, so as to extend between the saws, are rotary pickers consisting of a shaft 16 and teeth 17 projecting therefrom to enter between the saws so as to engage and extract from the cotton any burs or hulls that may be commingled therewith. This bur extractor or picker is housed within an offset 17' from the cotton discharging tube 2 and from the said housing a spout 18 extends to carry off the extracted burs or hulls. The cotton discharging tube 2 is illustrated as entering directly into a gin, but it will be readily understood that the cotton may be delivered onto a distributing belt, as such arrangement is within the scope of my invention. The dirt discharging spouts or tubes 4 extend from the casing 1 below the outlet tube 6, and immediately below said outlet tube a vacuum or dead air tube 19 is disposed exteriorly of the said dirt discharging tubes and communicates with the same. Below the said tube 19 the dirt discharging tubes or spouts 4 lead into the dirt pipes 20, and branches 21 lead downwardly from said dirt pipes 20 into a dirt discharging pipe 22 which is located below the floor of the gin room, the spout or nozzle 18 leading into one of the said branches, as clearly shown. The dirt pipes 20 extend the full length of a battery of gins and run across and communicate with the dirt discharging tubes or spouts 4. In installing gins embodying my invention, these dirt pipes 20 are connected at one end with the fan and at the other end lead to a place of deposit and preferably merge into the dirt tube 22. The fan is preferably the same fan by which a suction is created through the casing so that the said fan will also send a blast through the dirt tubes.

A beater consisting of a shaft 23 and arms 24 radiating therefrom is mounted within the cylindrical portion of the slotted casing 7 so that as the cotton is delivered into said casing from the inlet tube 5 it will be thoroughly agitated and beaten with the result that the dirt and dust will be effectually loosened and will be then drawn through the slotted metal by the suction, and passed to the discharging spouts or tubes 4, as will be readily understood. The beater may be actuated through any convenient gearing while the bur extractor, the saws, the brush 15 and the valve 9 are illustrated as being driven by belts and a train of gearing from the main driving shaft of the gin.

Valves are provided at the lower ends of the spouts 4 to support the dirt until the weight of the same overcomes the force of the blast below the valves whereupon the valves will open and discharge the dirt into the pipes 20. One of these valves is shown conventionally at 25 and their operation will be readily understood by those skilled in the art.

In the operation of my invention the cotton is drawn into the casing 7 where it is agitated by the beater and the dirt and dust loosened and separated therefrom. The cotton will pass through the discharge tube 2, and the dirt and dust will pass downwardly through the discharge tubes 4 and thence into the dirt pipes 20 and 22, and this action of the dirt and dust is accelerated by forcing the air draft through the said dust pipes, 20 thus creating an under current below the slotted casing and through the discharge tubes 4 and a partial vacuum or dead air space within said tubes below the tubes 19 whereby the dirt and dust will be positively drawn into the dirt discharging tubes. The tubes 19 play an important part in the formation of this partial vacuum or dead air space inasmuch as they serve to divert the air currents which would otherwise pass downwardly through the spouts 4 more remote from the fan, the result being that the air currents will passs through the dead air tubes into the discharge tubes 4 nearer the fan and will thence be drawn out through the outlet tubes 6, as will be readily understood. The cotton will pass downwardly through the cotton discharging tube 2, as before stated, and will be compelled to travel to the valve 12 by the rotary valve 9. When the valve 12 is in the position illustrated, the cotton will be diverted to pass to the saws, and as the saws rotate they will take into the cotton and separate the same from the burs and hulls, the seed cotton passing between the saws and the ribs 13, while the burs and hulls will be prevented by the said ribs from passing between the saws. The burs and hulls tend to adhere to the cotton and accumulate near the lower portion of the ribs 13, but the pickers 17 rotating against the direction of movement of the cotton will engage the said burs and hulls so as to positively and rapidly extract them from the cotton and deliver them into the spout or nozzle 18, whence they will pass to the dirt discharging pipes.

From the foregoing description taken in connection with the accompanying drawings, it will be seen that I have provided a simple and compactly arranged mechanism by which the cotton will be thoroughly cleaned and freed of all impurities before passing into the gin. The location of the bur extractor provides for the removal of all burs from the seed cotton before the latter reaches the gin feeder, thereby enabling the cleaning mechanism in the gin feeders to remove any particles, burs, trash, or other foreign matter still adhering to the cotton before it reaches the saws which remove the lint or fiber from the seed. The provision of an under current below the slotted casing and the outlet from the cleaner casing causes the dirt, trash, and other foreign matter to pass by its own weight or gravity through the perforated material thereby removing it from the cotton and discharging it in various dirt boxes without excessive wear on the blades of the fan. As the ends of the dead air tubes are spaced apart below the slotted material, the air current is spread and passes through the material in all directions instead of merely flowing in one stream through the length of the casing as heretofore so that a more thorough cleaning of the cotton is effected.

The screen is preferably slotted metal having openings two inches long and five thirty-seconds of an inch wide as these dimensions are found to give the most satisfactory results in removing large particles of leaf from the cotton and permitting said particles to pass out with the air.

The particular construction shown in the drawings is what I now believe to be the best embodiment of the invention, but it is to be understood that the drawing is illustrative only and not restrictive and that changes may be made in the minor details of construction and arrangement of parts without involving any departure from the spirit or scope of the invention, as the same is defined in the following claims.

Having described my invention, what is claimed as new is:

1. In an apparatus for the purpose set forth, the combination of a casing, a beater therein, a dirt discharging tube leading from the casing, a cotton discharging tube leading from the casing at the side of the dirt discharging tube, a saw disposed within the cotton discharging tube, a rotary picker arranged adjacent the saw and coöperating therewith, an offset on the cotton discharging tube housing said picker, and a discharging spout leading from the said offset into the dirt discharging tube.

2. In an apparatus for the purpose set forth, the combination of a casing, a beater therein, a dirt discharging tube leading from the casing, a cotton discharging tube leading from the casing at the side of the dirt discharging tube, a gang of saws within said tube, guards extending between the saws, a rotary picker arranged in advance of the saws and immediately adjacent thereto, a housing for the rotary picker, and a discharge spout leading from said housing into the dirt discharging tube.

3. In an apparatus for the purpose set forth, the combination of a casing, a separating mechanism therein, a cotton discharging tube leading from the casing, a saw within the said tube adjacent one side thereof, a partition within the tube adjacent and spaced from the opposite side thereof, a valve mounted within the tube at the upper end of said partition, a guard extending from the valve past the saw and diverging from the said partition, and a picker arranged to coact with the saw.

4. An apparatus for the purpose set forth comprising a casing, a beater within the casing, dirt discharging spouts leading from the casing, a cotton conveying tube leading from the casing, a bur extracting mechanism located within the cotton conveying tube, means for creating dead-air spaces in the upper portions of the dirt discharging spouts, and means for creating an under current in the dirt-discharging spouts.

5. An apparatus for the purpose set forth comprising a casing, a beater within the casing, dirt discharging spouts leading from the casing, a cotton conveying tube leading from the casing, a bur extracting mechanism located within the cotton conveying tube, and means for creating dead air spaces in the dirt-discharging spouts.

6. In an apparatus for the purpose set forth, the combination of a casing, means therein for separating dirt from cotton, dirt discharging spouts leading from the casing, a cotton discharging tube leading from the casing, a bur extractor within said cotton discharging tube, a discharge spout leading from the bur extracting mechanism into one of the dirt discharging tubes, and means for creating dead air spaces in the dirt discharging spouts.

7. In an apparatus for the purpose set forth, the combination of a casing, a beater therein, a cotton conveying tube leading from said casing, a by-pass within said tube, a bur extractor disposed at one side of the by-pass, means within the tube for directing the cotton through the by-pass or to the bur extractor, and means for creating dead air spaces around the upper portion of the cotton conveying tube and below the casing from which it leads.

In testimony whereof I affix my signature in presence of two witnesses.

WILLIAM R. LAMB. [L. S.]

Witnesses:
J. D. YOAKLEY,
SAMUEL N. ACKER.

Copies of this patent may be obtained for five cents each, by addressing the "Commissioner of Patents, Washington, D. C."